Inventors:
Lloyd C. Downes,
Winifred F. Baker,
by Merton D. Morse
Their Attorney.

March 9, 1954

L. C. DOWNES ET AL

SYNCHRONIZED INTERMITTENT LIGHT SOURCE AND FILM DRIVING MECHANISM 2,671,377

Filed May 11, 1951

2 Sheets-Sheet 2

Inventors:
Lloyd C. Downes,
Winifred F. Baker,
by Merton D. Morse
Their Attorney.

Patented Mar. 9, 1954

2,671,377

UNITED STATES PATENT OFFICE 2,671,377

SYNCHRONIZED INTERMITTENT LIGHT SOURCE AND FILM DRIVING MECHANISM

Lloyd C. Downes, Los Angeles, Calif., and Winifred F. Baker, Syracuse, N. Y., assignors to General Electric Company, a corporation of New York Application May 11, 1951, Serial No. 225,897

8 Claims. (Cl. 88—18)

Figure 1:
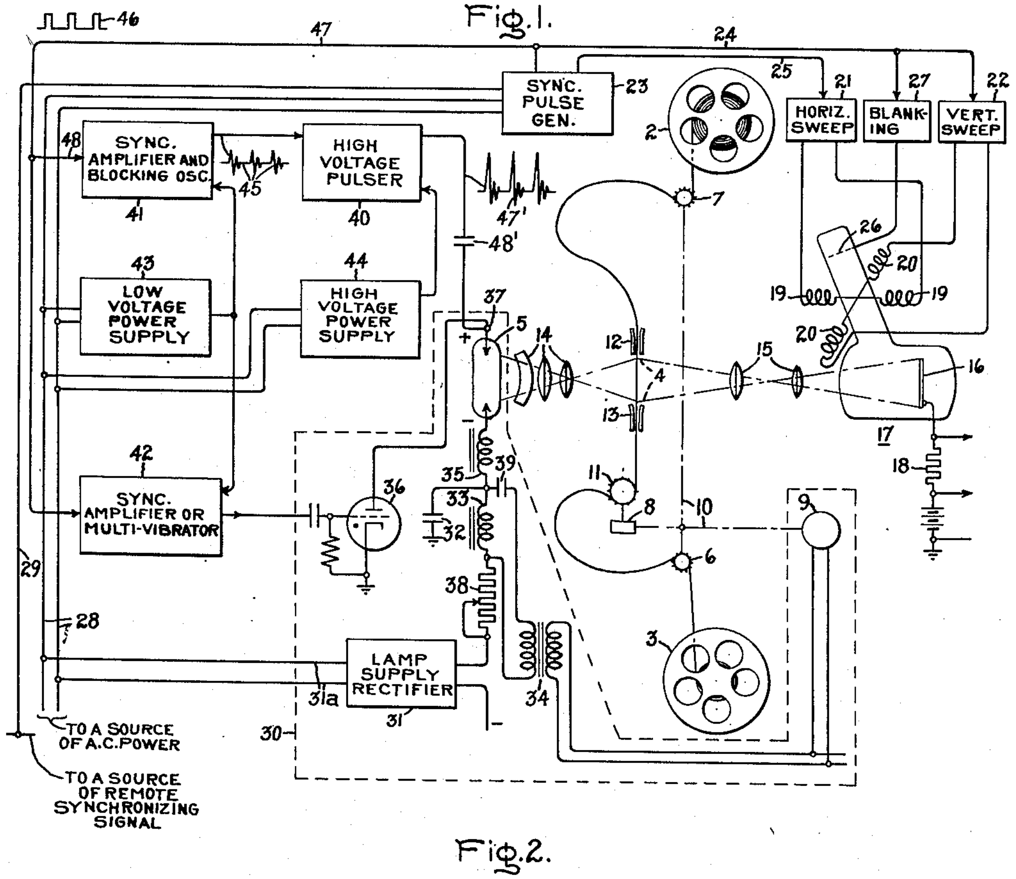

Our invention relates to pulse light projection systems and has particular application to circuits for use in pulse light motion picture projection systems for synchronization of the motion of motion picture film with the illumination thereof.

It is well known that a motion picture film comprises a series or sequence of individual pictures in which each picture differs slightly from the preceding picture. When the individual pictures are projected in a rapid sequence on a screen the illusion of motion is created in the eyes of the observer.

In common motion picture practice a constant source of illumination for the film is utilized. Projection of successive still pictures on a screen is done by means of mechanical shutters which periodically, at a rate of 24 frames per second, interrupt light from the aforementioned source. During the light interruption period the film is moved from one still picture to the next by mechanical means synchronized with the shutter motion.

When it is desired to televise a motion picture film, some unusual problems are presented. In the first place the television field scanning rate, according to present day standards is 60 fields per second. Therefore the 24 frame film rate must be synchronized with the 60 cycle field scanning rate. Various methods have been devised for accomplishing this successfully and this feature forms no part of the present invention. However, a much more severe limitation is the fact that in present day television systems utilizing the cathode ray type, or camera, pickup tube, the photosensitive mosaic light responsive area of the camera must be illuminated with a film image only during the vertical retrace or vertical blanking intervals. As is well understood in the art, this illumination produces a charge image on the light responsive area which is then removed by the cathode ray during succeeding scans of the picture field and is converted to the television image signal.

In the past few years increasingly rigid limitations have been imposed on the fraction of the $1/60$ of a second field scanning interval which can be utilized for vertical blanking and retrace. Accordingly, if the conventional incandescent light source and mechanical shutter arrangement is used in the camera under these conditions it becomes exceedingly difficult to maintain exact mechanical synchronism between the shutter and the television scanning action.

In U. S. Patent #2,499,181 issued February 28, 1950, there is disclosed a pulse light motion picture projection system particularly adapted to a television film projection system in which no mechanical shutter is required and in which the film is illuminated from a gaseous discharge device which is pulsed in accurate synchronism with the television camera sweep and with the camera film drive mechanism. In this system a three phase source of power is utilized. A three phase synchronous motor drives the film moving mechanism while one phase of the three phase source of power energizes the synchronizing pulse generator which times the light flashes. In this way the film motion and the light flashes are kept in synchronism.

The present invention has for one of its objects to provide an improved pulse light projection system of this general type operative from a single phase source or a unidirectional source of power.

Another object of our invention is to provide an improved pulse light projection system in which the pulse light and the film drive motor are synchronized with a pulse which may be obtained from a synchronizing pulse generator which is slaved or held in synchronism with a remote synchronizing signal.

Still another object of our invention is to provide a circuit simple in construction yet effective and efficient in operation by means of which the pulse light and film drive may be accurately and effectively timed.

A still further object of our invention is to provide means by which positive synchronization of the film drive motor with remote synchronizing signals is obtained.

Figure 2:
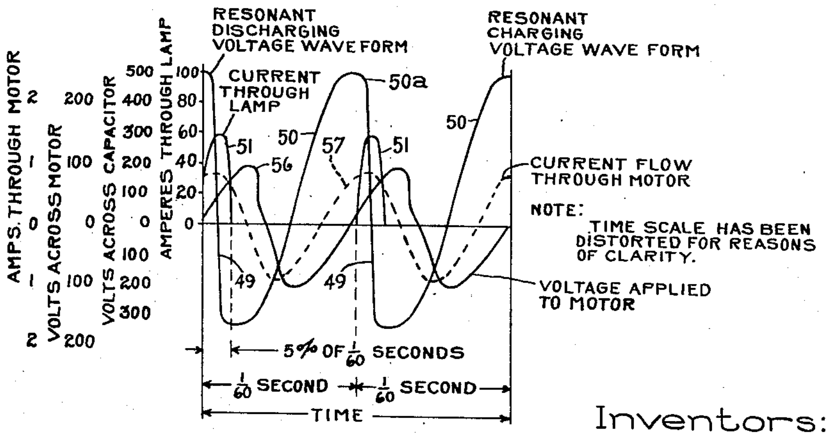
Figure 3:
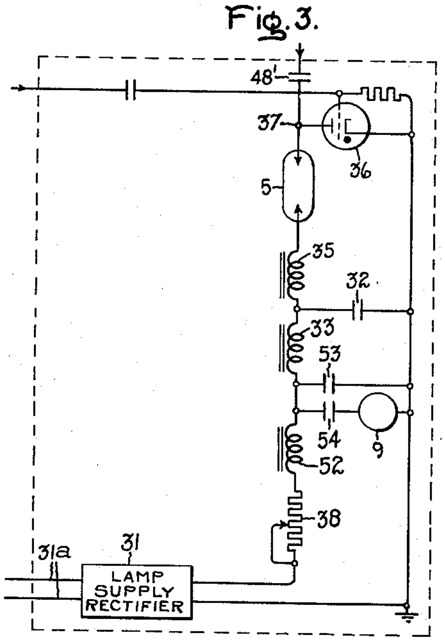
Figure 4:
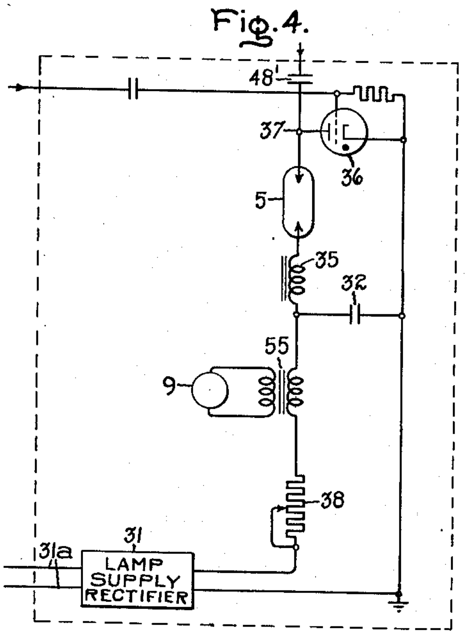
Figure 5:
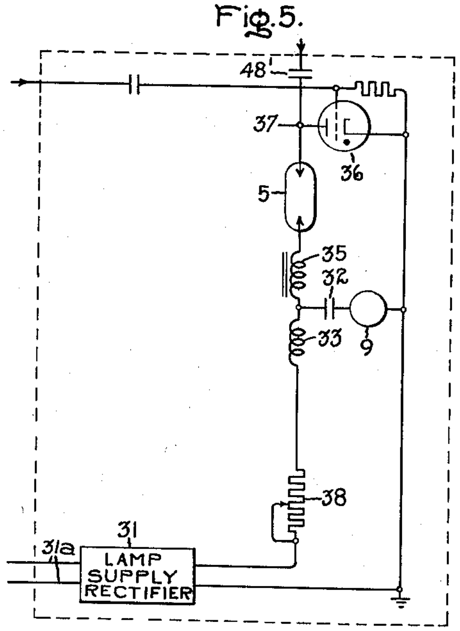

The novel features which we believe to be characteristic of our invention are set forth with particularity in the appended claims. Our invention itself, however, both as to its organization and method of operation, together with further objects and advantages thereof may best be understood by reference to the following description taken in connection with the accompanying drawings in which Fig. 1 is a simplified schematic representation of a motion picture television projection system embodying the invention; Fig. 2 is a graphical representation of a voltage and current wave forms which will be referred to for a better understanding of the operation of our invention. Figs. 3, 4 and 5 show schematic representations of variations in the circuits of our invention.

In an exemplary embodiment proper synchronization between the illumination of the film and the motion of the film is obtained by providing a series resonant charging circuit and a series resonant discharging circuit including a gaseous discharge lamp. The resonant circuits have a capacitor in common. The repetition rate of the charging circuit corresponds to the pulse light repetition rate. The resonant frequency of the discharging circuit corresponds to the duration of the light pulses.

The voltage developed across the capacitor at the peak of its charging cycle is not sufficient to fire the lamp. However, when suitable triggering pulses are applied to the lamp while the capacitor is at the peak of its charging cycle, the capacitor discharges through the lamp. By providing a unilateral conducting device in the discharge circuit, the resonant discharge of the capacitor passes a single pulse of current through the lamp and of a duration corresponding to the resonant frequency of the resonant discharge circuit. Periodic triggering of the lamp causes flow of energy into the capacitor and then out of the capacitor to the lamp. The periodic fluctuation of energy in the resonant charging circuit is utilized to supply the film drive motor. Thus a definite relationship exists between the current flow through the lamp and current flow into the motor. Accordingly, the illumination of the film and the motion of the film may be properly held in synchronism.

Referring now to Fig. 1 of the drawings motion picture projection apparatus is represented diagrammatically in which a motion picture film 1 is unwound from a reel 2 and rewound on a reel 3. During this operation the film passes in its travel through an aperture 4 where light is transmitted through it from a lamp 5. The film 1 is also driven by means of sprockets 6 and 7, and by the intermittent driving mechanism 8. The sprockets 6 and 7 and the intermittent drive mechanism 8 are interconnected for operation by means of a single phase motor 9 as indicated schematically by the dash lines 10. The intermittent drive mechanism 8 also drives a third sprocket 11 which operates intermittently to pull film 1 in step by step fashion through a pair of pressure shoes 12 and 13. These pressure shoes each comprise a pair of members on opposite sides of the film to guide it across the aperture 4. Preferably, one of each of these pairs of members is fixed in position and the other is spring biased against the film to produce a certain amount of friction, thereby to keep the film 1 taut across the aperture 4, and to hold it in position when the film is stopped.

Light from the lamp 5 passes through appropriate condensing lenses 14, then through the film at the aperture 4, and then through further objective lenses 15. An image of the film is thereby produced upon the photosensitive area 16 of a television camera pickup tube 17. In the illustrative embodiment of the invention, the camera tube is represented as of the cathode ray type commonly referred to as an iconoscope. All the apparatus between the lamp 5 and the camera tube 17 is conventional apparatus commonly used in motion picture television projection equipment, and differs from conventional equipment only in that the mechanical shutters, normally utilized to interrupt the continuous light beam are omitted.

As is well understood in the art, in the illustrated type of camera tube 17, the surface 16 comprises elemental, photosensitive area which become electrically charged when light falls thereon to an extent dependent upon the intensity of the light. Thus a charge image is produced and when the cathode ray beam impinges upon these elemental areas, such areas discharge, producing a beam current through a resistance 18 of intensity dependent upon the degree of light to which each elemental area is subjected. The voltage from this resistance 18 may be supplied to a conventional television transmitter for transmission in a well known manner. The camera tube 17 is provided with the horizontal ray deflection coils 19 and vertical ray deflection coils 20. These coils are supplied with substantially saw tooth current waves from horizontal and vertical sweep generators 21 and 22, respectively. According to present television standards the vertical sweep generator 22 produces a wave having a frequency of 60 cycles per second, and is synchronized with a pulse generator 23 over conductor 24. The horizontal sweep generator 21 operates at a much higher frequency, 15,750 cycles per second according to present standards, and is likewise controlled in frequency and in time phase relation to generator 22 from the synchronizing pulse generator 23 over conductor 25. The intensity control grid 26 of the camera tube 17 is supplied with negative blanking pulses, according to conventional practice, during the horizontal and vertical retrace intervals from a blanking generator 27 which is likewise controlled from the synchronizing pulse generator 23.

The synchronizing pulse generator 23 is supplied with 60 cycle power over conductors 28 and may be synchronized therewith or preferably the pulse generator 23 is synchronized with the remote synchronizing signal supplied over conductor 29.

Referring now particularly to the portion of the system of Fig. 1 contained in the dotted box 30 there is shown an exemplary embodiment of a circuit according to our invention for synchronizing the flashes of light from the gaseous discharge gap lamp 5 with the motion of film 1. A rectifier 31 which may be energized from an alternating current source over conductors 31*a* supplies a unidirectional potential to a resonant charging circuit comprising capacitor 32, inductance 33, and a resistance 38. The primary of transformer 34 is connected in parallel across inductance 33 through direct current isolating capacitor 39. By a resonant charging action well understood in the art, and which makes use of the fact that when a unidirectional potential is applied to a series resonant circuit the transient voltage developed across the capacitance of resonant circuit may considerably exceed the unidirectional voltage in magnitude, the capacitor 32 is charged to a considerably higher potential than the potential of the unidirectional supply. For example, in one particular installation, the capacitor 32 was charged to a maximum potential of about 600 volts though the rectifier supply voltage was of the order of 150 volts. The magnitude of the peak voltage to which capacitor 32 is charged is controlled by variable resistor 38. The potential to which the capacitor 32 charges is insufficient to cause a flash through the gap lamp 5.

The capacitor 32, the inductance 35, the gap lamp 5, and the lamp cutoff device 36 which may be a thyratron, comprise a resonant discharge circuit. When a high voltage pulse of positive polarity is applied to terminal 37 of the lamp 5 and at the same time the lamp cutoff device 36 is triggered or rendered conductive, the capacitor 32 discharges through the lamp 5 and device 36, producing a flash of light. The device 36 which of course is unidirectionally conductive prevents current flow in the reverse direction through the lamp 5 thereby extinguishing the lamp when the current flow through the device 36 passes through zero. When lamp 5 is extinguished, capacitor 32 charges again in a manner shown in curve 50 of Fig. 2.

By properly selecting the series resonant frequency of the resonant charging circuit, which is determined principally by the values of inductance 33 and capacitor 32, with regard to the frequency at which the lamp 5 and the lamp cutoff device 36 are triggered, the capacitor 32 may be discharged through the lamp at the maximum point of its voltage cycle. The recurrent discharging of the capacitor 32 through the lamp 5 produces flashes of light accurately timed with respect to the synchronizing pulse which drives the horizontal sweep and the vertical sweep of the iconoscope 17. The recurrent surges of charging current in the series resonant charging circuit are accurately fixed in time with respect to the flashes of light produced in the lamp. By means of the transformer 34, the secondary of which is connected to the film drive motor 9, a portion of a periodic energy flow in the resonant charging circuit is utilized to drive the motor 9 which may, for example, be a single phase alternating current motor. The wave form of current in the resonant charging circuit is relatively fixed and relatively accurately timed with respect to the light flashes from the lamp 5. Accordingly, the motor 9 can be driven from this source of energy so as to maintain the motion of film 1 properly synchronized with the flashes of light produced by the lamp 5.

The high voltage pulses which are used to trigger the lamp 5 are obtained from a high voltage pulser 40 and an amplifier and blocking oscillator 41 which is accurately timed or triggered by synchronizing pulse generator 23. Likewise the lamp cutoff device 36 is triggered by synchronizing amplifier or multivibrator 42 which is accurately triggered by pulses from the synchronizing pulse generator 23.

The low voltage supply 43 which is energized from an alternating current source supplies voltage for the operation of the amplifier and blocking oscillator 41 and the synchronizing amplifier or multivibrator 42. A high voltage supply 44 which also may be energized from an alternating current source supplies high voltage to the high voltage pulser 40.

Pulser 40 is driven by positive pulses 45 from a blocking oscillator 41 which is in turn synchronized by substantially rectangular pulses 46 over conductors 47 and 48. Pulses 47′ are produced at the output of the pulser 40 and are applied to terminal 37 through coupling capacitor 48′. Pulses 46 are the same pulses supplied by the synchronizing pulse generator to synchronize the vertical sweep generator 22. All of the pulses 45, 46 and 47 recur at the 60 cycle vertical sweep frequency.

Fig. 2 illustrates certain graphs representing the variations with time of certain of the electrical quantities which occur in the system. This figure time is plotted as abscissa against certain electrical values plotted as ordinates.

In this figure curve 50*a* represents the variations of voltage across capacitor 32. The resonant discharging voltage variation across capacitor 32 represented by portion 49 of curve 50*a* generally speaking is of sinusoidal waveform having a frequency determined by the series resonant frequency of the series resonant discharge circuit. The resonant charging voltage variation across capacitor 32 represented by portion 50 of curve 50*a* is also of sinusoidal wave form having a much lower frequency which is determined by the series resonant frequency of the series resonant charging circuit. During the intervals of discharge of capacitor 32, current pulses 51 flow through the lamp 5. As mentioned above the capacitor 32 is discharged through the lamp 5 at the top of its voltage cycle thereby developing the voltage wave form 50*a* comprising curves 49 and 50 substantially as shown in Fig. 2.

The wave form of current flowing in the resonant charging circuit, not shown in Fig. 2, is complex in nature and of the same periodicity as the wave form of voltage across capacitor 32. Wave form of current in the resonant charging circuit is relatively fixed with respect to the periodic current flow through the lamp 5. Accordingly this current can be utilized for energizing the alternating current motor 9 for properly synchronizing the motion of film 1 with the illumination thereof.

The wave forms of voltage across the motor 9 and current through the motor are shown as curves 56 and 57 respectively. Since the phase of the driving voltage across motor 9 and of the current through the motor are fixed with respect to the current pulses 51 through the lamp 5 the intermittent motion of the film 1 is accurately timed or synchronized with the illumination thereof.

The numerical values of voltage and current set forth in Fig. 2 are for the purposes of illustration. They are values that were found suitable for the embodiment shown in Fig. 1. In the embodiment of Fig. 1, a single phase motor rated at 1/75 horsepower was found quite satisfactory.

Lamp 5 may be a gas filled discharge lamp comprising a pair of pointed tungsten alloy electrodes sealed in a glass envelope filled with xenon gas at a pressure of about 600 mm. For further details with regard to the lamp 5 and with regard to the passage of current pulses through said lamp reference should be made to the aforementioned patent.

The present invention is particularly addressed to the utilization of the fluctuating currents in the lamp illumination circuit for the purpose of properly timing or synchronizing the motor 9 which drives the film 1 with respect to the illumination produced by the lamp. Further details as to the operation of the resonant charging, discharging circuits and to the triggering circuits associated with the lamp may be had by referring to the aforementioned patent.

It will be understood that various ways may be utilized for coupling energy from the circuits associated with the gap lamp 5, to drive the motor 9. In Fig. 3 is shown another circuit which may be substituted for the portion of the system of Fig. 1 shown in the dotted box 30. Like numerals have been used to designate like parts. By the addition of inductance 52 in series with resonant charging circuit including inductance 33 and capacitance 32 and the addition of capacitance 53 in shunt with the resonant charging circuit including inductance 33 and capacitance 32 a relatively more uniform voltage is supplied to the capacitor 32. In addition, a voltage wave form is obtained across capacitor 53 which is similar to the wave form across capacitor 32 but substantially more sinusoidal. Capacitor 32 periodically partially discharges capacitor 53 through inductance 33 on the charging cycle of capacitor 32. Capacitor 53 is periodically recharged through filter inductance 52. Hence a voltage fluctuation appears across capacitor 53 which bears a fixed time relationship to the voltage across capacitor 32. Accordingly, the periodic fluctuations of voltage across capacitor 53 may be used to drive motor 9. Capacitor 54 is a coupling capacitor permitting parallel connection of the drive motor 9 across the capacitor 53.

In Fig. 4 is shown another circuit which may be substituted for the portion of the system of Fig. 1 shown in the dotted box 30. The circuit of Fig. 4 is identical to the circuit of Fig. 1 except that a single transformer 55 is used in place of a transformer 34 and the inductance 33 in Fig. 1. The transformer 55 acts as a series inductance during the resonant charging cycle and thus takes the place of a separate series inductance, such as inductance 33 used in the circuit of Fig. 1.

In Fig. 5 is shown still another circuit characterized by simplicity which may be substituted for the portion of the system of Fig. 1 shown in the dotted box 30. In the circuit of Fig. 5, motor 9 is connected in series with both the series resonant charging circuit and the series resonant discharge circuit as shown.

It will be understood that any of the above circuit arrangements for supplying power to the drive motor 9, may be heavily loaded in bringing the motor 9 up to speed when the system is first energized. Accordingly, various auxiliary circuit arrangements for independently bringing the motor 9 up to operating speed may be employed.

While we have shown particular embodiments of our invention it will of course be understood that we do not wish to be limited thereto since many modifications both in the circuit arrangement and in the instrumentalities employed may be made. We, therefore, contemplate by the appended claims to cover any such modification as fall within the true spirit and scope of our invention.

What we desire to claim and secure by Letters Patent of the United States is:

1. The combination, in motion picture apparatus of the type wherein images from a moving picture film are recurrently projected upon a screen, of a lamp, a capacitance connected in series with said lamp, means for charging said capacitance and then discharging said capacitance through said lamp recurrently to produce recurrent flashes of light for illuminating said film, the recurrent charging and discharging of said capacitance causing alternations in current flow to said capacitance, a recurrent film driving mechanism, electromotive means for operating said film driving mechanism in step with alternations supplied thereto, and coupling means coupled between said capacitance and said electromotive means for coupling said alternations in current flow to said capacitance to said electromotive means for the energization thereof, whereby the recurrent motion of said film is maintained in accurately timed relationship with respect to the recurrent illumination of said film.

2. The combination in claim 1 wherein said coupling means are inductive coupling means.

3. The combination in claim 1 wherein said coupling means are capacitive coupling means.

4. The combination in claim 1 wherein said lamp is a gaseous discharge gap lamp.

5. The combination, in motion picture apparatus of the type wherein images from a moving picture film are recurrently projected upon a screen, of a lamp, a capacitance, a recurrent film driving mechanism, and electromotive means for operating said film driving means, said lamp, said capacitance and said electromotive means being connected in series relationship, a source of unidirectional supply voltage, said capacitance and said electromotive means being connected in series circuit across said source, means for charging said capacitance through said electromotive means and means for discharging said capacitance through said electromotive means and through said lamp recurrently to produce recurrent flashes of light for illuminating said film, the recurrent charging and discharging of said capacitance causing alternations in current flow to said capacitance, said electromotive means being energized from said alternations in current flow to cause said film driving means to move in step with said alternations, whereby the recurrent motion of said film is maintained in accurately timed relationship with respect to the recurrent illumination of said film.

6. The combination, in motion picture apparatus of the type wherein images from a moving picture film are recurrently projected upon a screen, of a lamp, a capacitance connected in series with said lamp, an impedance, means for charging said capacitance through said impedance and then discharging said capacitance through said lamp recurrently to produce recurrent flashes of light for illuminating said film, the recurrent charging and discharging of said capacitance causing alternations in current flow to said capacitance, a recurrent film driving mechanism, electromotive means for operating said film driving means in step with alternations supplied thereto, and coupling means coupled between said impedance and said electromotive means for coupling said alternations in current flow to said capacitance to said electromotive means for the energization thereof, whereby the recurrent motion of said film is maintained in accurately timed relationship to the recurrent illumination of said film.

7. In a high intensity pulse illumination system for a film projector or the like, the combination of a gaseous discharge lamp for illuminating said film, an oscillatory discharge circuit serially comprising said lamp, a capacitor and a normally non-conducting unilateral discharge device, said circuit having a predetermined natural frequency of oscillation, power supply means for charging said capacitor to a unidirectional potential insufficient to fire said lamp, pulse triggering means for synchronously rendering both said lamp and said device conducting to produce an intense light flash resulting from discharge of said capacitor through said lamp and device, means for restoring said discharge device to nonconductive condition within the first half cycle of oscillation of said current, a recurrent film driving mechanism, electromotive means for operating said film driving mechanism in step with alternations supplied thereto, and coupling means coupled between said capacitor and said electromotive means for coupling alternations in current flow to said capacitor to said electromotive means for the energization thereof, whereby the recurrent motion of the film of said film projector is maintained in timed relationship with respect to the occurrence of said flashes of light.

8. In a high intensity pulse illumination system for a film projector or the like wherein a moving film is recurrently illuminated by light pulses at a predetermined frequency, the combination of a gaseous discharge bilaterally conducting gap lamp for illuminating said film, a recurrent film driving mechanism for moving said film, electromotive means for operating said mechanism, a resonant discharge circuit serially including said lamp and a capacitor, said discharge circuit resonating at a frequency above said predetermined frequency, a triggering circuit for impressing high voltage pulses on said lamp and capacitor which recur at said frequency, a resonant charging circuit including said capacitor and a unidirectional potential source, said charging circuit resonating at a frequency below said predetermined frequency and providing a resonant rise in voltage upon said capacitor above the potential of said source, said voltage being insufficient to trigger said lamp except when said pulses are applied, means in said discharge circuit for extinguishing said lamp when the capacitor discharge current first goes through zero after application of each pulse, means for coupling the alternations in current flow in said charging circuit to said electromotive means for the energization thereof, whereby, said film is caused to move in timed relationship with respect to the recurrent illumination thereof.

LLOYD C. DOWNES.
WINIFRED F. BAKER.

References Cited in the file of this patent

UNITED STATES PATENTS

| Number | Name | Date |
|---|---|---|
| 2,203,437 | Levy | June 4, 1940 |
| 2,499,181 | Downes et al. | Feb. 28, 1950 |
| 2,525,891 | Garman | Oct. 17, 1950 |
| 2,600,868 | Hales | June 17, 1952 |

FOREIGN PATENTS

| Number | Country | Date |
|---|---|---|
| 161,633 | Germany | July 14, 1905 |